United States Patent [19]

Winnale

[11] 4,256,329
[45] Mar. 17, 1981

[54] CHILD RESTRAINT FOR PASSIVE RESTRAINT SYSTEM

[75] Inventor: James A. Winnale, Warren, Mich.

[73] Assignee: General Motors Corporation, Detroit, Mich.

[21] Appl. No.: 77,949

[22] Filed: Sep. 24, 1979

[51] Int. Cl.³ .............................................. B60R 21/10
[52] U.S. Cl. .................................. 280/802; 280/807; 280/808; 297/250; 297/483
[58] Field of Search ............... 280/801, 802, 803, 807, 280/808; 297/250, 483, 469, 474, 475, 476, 477, 478, 479

[56] References Cited

U.S. PATENT DOCUMENTS

| 3,207,552 | 9/1965 | Loughney | 297/250 X |
| 3,893,704 | 7/1975 | Torner | 280/801 |
| 3,942,820 | 3/1976 | Lindblad | 280/802 X |
| 4,179,136 | 12/1979 | Matsuoka | 280/807 |

Primary Examiner—John J. Love
Assistant Examiner—Randall A. Schrecengost
Attorney, Agent, or Firm—Charles E. Leahy

[57] ABSTRACT

A three-point passive seat belt system includes a continuous-loop restraint belt having upper and lower ends attached to the door and a control belt having an outboard end attached to a junction ring which encircles the continuous-loop belt to define lap and shoulder belt portions. An inboard retractor winds the control belt when the door is closed to establish the lap and shoulder belt portions respectively across the lower and upper torso of the occupant. The outboard end of the lap belt is attached to the door by a resilient anchor strap and disconnect buckle located substantially forward on the door to permit limited forward excursion of the occupant lower torso simultaneous with limited forward excursion of the upper torso to maintain the occupant in a more vertically upright position to thereby limit forward rotational excursion of the head. An auxiliary buckle is mounted on the vehicle body adjacent the outboard side of the passenger seat and more rearwardly than the doormounted disconnect buckle for engagement by the lap belt to restrain a child occupant against forward excursion of the lower torso. The lap belt is also engaged with the auxiliary buckle for restraint of a child seat so that the lap belt remains disposed in restraining position across the child seat when the door is opened.

3 Claims, 3 Drawing Figures

CHILD RESTRAINT FOR PASSIVE RESTRAINT SYSTEM

The invention relates to a passive seat belt system and more particularly provides a passive seat belt system adapted for restraint of an adult occupant, a child, and a child seat.

BACKGROUND OF THE INVENTION

Copending patent application, Ser. No. 077,142 by James Winnale et al, filed Sept. 19, 1979, and owned by a common assignee provides a three-point passive seat belt system wherein a continuous-loop restraint belt has upper and lower ends attached to the door. A control belt has an outboard end attached to a junction ring which encircles the continuous-loop belt to define lap belt and shoulder belt portions. The inboard end of the control belt is mounted inboard the seat by a retractor which winds the control belt when the door is closed to establish the lap and shoulder belt portions respectively across the lower and upper torso of the occupant. The outboard end of the lap belt is attached to the door by a resilient anchor strap and disconnect buckle located substantially forward of the mounting location specified by Motor Vehicle Safety Standard 210. The relatively forward mounting location of the outboard lap belt ends permits limited forward excursion of the occupant lower torso simultaneous with limited forward excursion of the upper torso to maintain the occupant in a more vertically upright position to thereby limit forward rotational excursion of the head.

SUMMARY OF THE INVENTION

The present invention relates to improvements in the above-described three-point passive system to adapt the restraint system associated with the passenger seat for improved restraint of a child or a child seat.

According to the present invention an auxiliary seat belt buckle is mounted on the vehicle body adjacent the outboard side of the passenger seat and more rearwardly than the door mounted disconnect buckle. Improved restraint of a child upon the passenger seat is provided by unbuckling the lap belt from the disconnect buckle and then buckling the lap belt to the auxiliary buckle so that the outboard lap belt end is anchored on the vehicle body at a more rearward location. This more rearward location of the lap belt limits forward excursion of the child lower torso. The passive excursion of the child lower torso. The passive belt system is adapted for restraint of a child seat by unbuckling the lap belt outboard end from the door connected disconnect buckle and buckling the lap belt to the auxiliary buckle. Accordingly, when the door is opened only the upper end of the continuous-loop belt is moved outwardly and forwardly by the swing of the door so that the junction ring connecting the continuous-loop belt with the control belt moves in the outboard and forward direction only about one-half the distance otherwise traveled and the lap belt and control belt continue to restrain the child seat on the passenger seat even though the door is open.

The object, feature and advantage of the invention resides in the provision of a body mounted auxiliary lap belt buckle adapted for selective engagement by the lap belt outboard end to adapt a three-point door connected adult occupant restraint for restraint of a child occupant.

Another object, feature and advantage of the invention resides in the provision of a body mounted lap belt buckle adapted for selective engagement by the loop belt outboard end so that only the outboard shoulder belt end moves outboard and forward with the door and the lap belt and the control belt continue to restrain the child seat upon the passenger seat.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
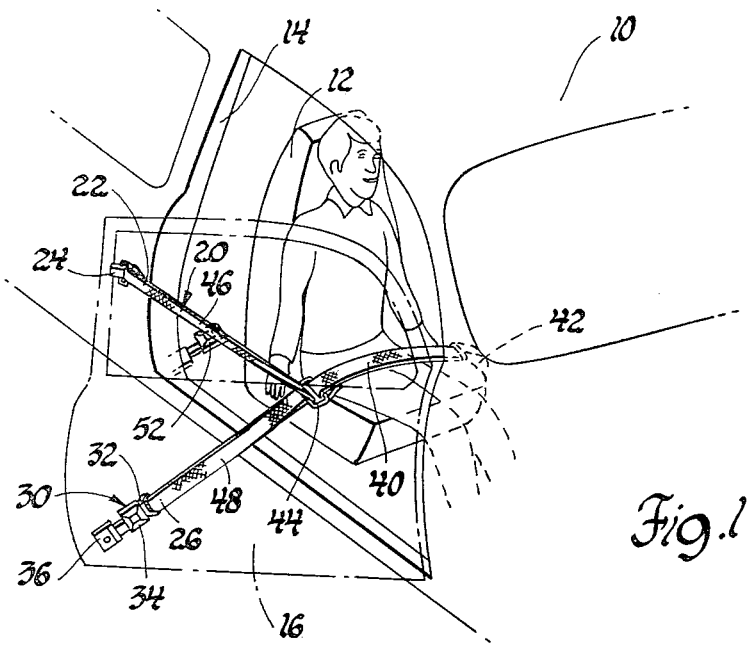
FIG. 1 is a perspective view of the vehicle body having a seat belt system according to the invention and showing the system adapted for restraint of an adult and the door in the open position.

Referring to FIG. 1, there is shown a vehicle body 10 having a seat 12 located laterally adjacent a door opening 14. A door 16 is hingedly mounted on the vehicle body 10 for swinging movement between an open position shown in FIG. 1 and a closed position.

A three-point continuous-loop passive occupant restraint system for restraining an occupant in the seat 12 includes a continuous-loop belt 20 having an upper end 22 attached to the upper rear corner of the door 16 by an anchor plate 24 and a lower end 26 attached to the lower rear corner of the door. The lower end 26 is attached to the door by an emergency disconnect buckle assembly generally indicated at 30 and including a latch plate 32 attached to the belt end and a door mounted pushbutton buckle 34 attached to the door 16 by an anchor plate 36.

A control belt 40 has an inboard end which is retractably mounted by a retractor 42 suitably mounted on the vehicle 10 inboard the occupant seating position. The retractor 42 is preferably of the vehicle inertia sensitive type having a lockbar which is engaged with a belt reel by a pendulum or other inertia responsive member upon the occurenece of a predetermined level of vehicle deceleration.

A junction ring assembly 44 is attached to the outboard end of the anchor belt 40 and slidably encircles the belt 20 to define a shoulder belt portion 46 and a lap belt portion 48. A suitable junction ring assembly 44 is disclosed in copending patent application Ser. No. 057,605 by Lloyd W. Rogers, Jr. et al, filed July 16, 1979 and owned by a common assignee.

Inboard swinging movement of the door 16 from the open position of FIG. 1 to the closed position moves the belt anchorages 24 and 36 inwardly and rearwardly adjacent the outboard shoulder and the outboard occupant hip. Simultaneously the retractor 42 winds the anchor belt 40 to establish the junction ring assembly 44 adjacent the inboard hip. Accordingly, the shoulder belt portion 46 and the lap belt portion 48 are established in their respective restraining positions across the upper and lower torso of the passenger seat occupant.

The lap belt anchor 36 is located forwardly of the anchorage location specified by MVSS 210 as described in copending patent application Ser. No. 077,142 by James Winnale et al filed Sept. 19, 1979. Accordingly, the occupant lower torso is permitted to move forwardly away from the seat in unison with upper excursion of the upper torso to effectively restrain the occupant and limit forward head rotation and excursion. Reference may be had to the copending application for a more detailed description of the passive belt and the mode of occupant restraint provided thereby.

Referring again to FIG. 1, it is seen that an auxiliary buckle 52 is mounted on the vehicle body outboard the seat 12 and rearward of the door mounted buckle 34.

Figure 2:
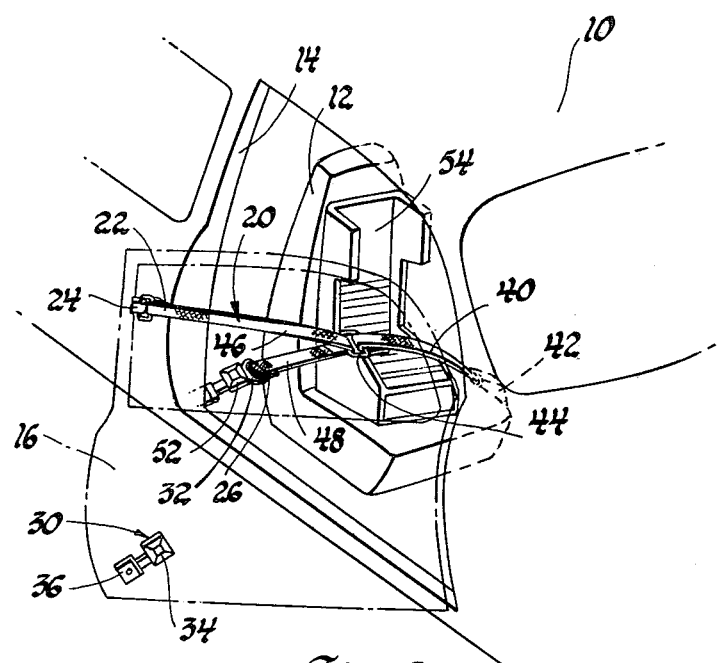
FIG. 2 is a view similar to FIG. 1 but showing the belt system adapted for restraint of a child seat.

Referring to FIG. 2, child seat 54 is shown positioned upon the passenger seat 12. The latch plate 32 connected to the lower end 26 of the lap belt portion 48 is disconnected from the door mounted buckle 34 and engaged with the body mounted auxiliary buckle 52. When the door is moved to the open position shown in FIG. 2, only the upper end 22 of the continuous-loop belt 20 is moved outwardly and forwardly of the seat. Accordingly, the outward and forward movement of the junction ring assembly 44 is limited to about one-half the distance traveled when the latch plate 32 is engaged in door mounted buckle 34 as seen in FIG. 1 so that the junction ring assembly 44 does not move outwardly beyond the outboard side of the child seat 54. Furthermore, the control belt 40 and the lap belt portion 48 remain disposed over the child seat to maintain the mounting of the child seat upon the passenger seat even though the door is moved to the open position.

Figure 3:
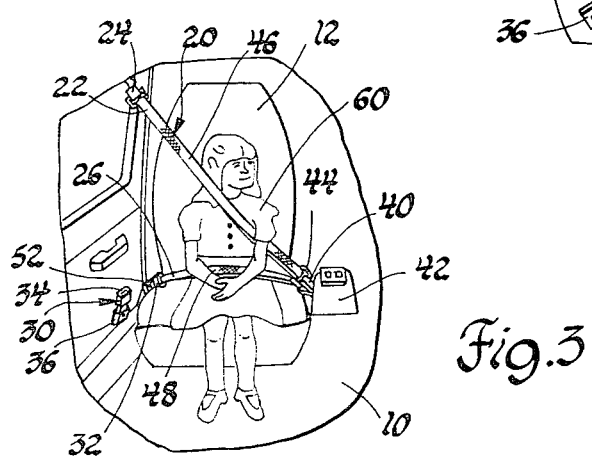
FIG. 3 shows the seat belt adapted for restraint of a child.

Referring to FIG. 3, a child 60 is seated upon the passenger seat 12. The latch plate 32 connected to the lower end 26 of the continuous-loop belt 20 is disengaged from the door mounted buckle 34 and engaged in the body mounted buckle 52. Accordingly, the outboard end of the lap belt 48 is anchored further rearwardly to better fit the child and restrain the child lower torso against forward excursion.

Thus it is seen that the invention provides a new and improved passive occupant restraint having an auxiliary buckle mounted on the vehicle body for selective engagement by the outboard lap belt end otherwise mounted on the door to adapt the passive belt system for restraint of a child or a child seat.

While this invention has been disclosed primarily in terms of the specific embodiment shown on the drawings, it is not intended to be limited thereto, but rather only to the extent set forth in the appended claims. For example, while the invention is disclosed herein as having buckles mounted on the door and the body for engagement by a belt mounted latch plate, it is within the scope of the invention to provide a buckle on the lap belt and latch plates on the door and the body. Furthermore it will be understood that the invention is not limited to use in the particular seat belt system of Ser. No. 077,142 as disclosed herein.

The embodiments of the invention in which an exclusive property or privilege is claimed are defined as follows:

1. In combination, a vehicle body having a seat located laterally adjacent a door hinged for movement between open and closed positions; a shoulder belt having an outboard end mounted on the upper rear corner of the door and an inboard end; a lap belt having an outboard end and an inboard end; a disconnect buckle adapted to attach the lap belt outboard end on the door and including a first buckle component mounted on the door and a second buckle component mounted on the outboard lap belt end; a retractor means mounted on the vehicle body inboard the occupant seat for winding the lap and shoulder belts to occupant restraining positions when the door is closed and permitting outward and forward movement of the lap and shoulder belts with the door to an occupant access position when the door is opened; and a third buckle component mounted on the vehicle body outboard the seat and generally adjacent the door-mounted first buckle component for selective coupling with the belt-mounted second buckle component to adapt the restraint system for restraint of a child or a child seat.

2. In combination, a vehicle body having a seat located laterally adjacent a door hinged for movement between open and closed positions; a shoulder belt having an outboard end mounted on the upper rear corner of the door and an inboard end; a lap belt having an outboard end and an inboard end; a disconnect buckle adapted to attach the lap belt end on the door and including a first buckle component mounted on the door and a second buckle component mounted on the outboard lap belt end, said first buckle component being located relatively forward on the vehicle door whereby the lower torso of the restrained occupant is permitted to move substantially forwardly in unison with forward movement of the upper torso into the shoulder belt to prevent forward pivoting movement of the upper torso and thereby limit forward rotation of the occupant head; a retractor means mounted on the vehicle body inboard the occupant seat for winding the lap and shoulder belts to occupant restraining positions when the door is closed and permitting outward movement of the lap and shoulder belts with the door to an occupant access position when the door is opened; and a third buckle component mounted on the vehicle body rearwardly of the door-mounted first buckle component for selective coupling with the belt-mounted second buckle component to adapt the restraint system for restraint of a child whereby the lower torso is restrained in a rearward position against forward movement to effectively restrain the child against forward movement beneath the shoulder belt.

3. A restraint system for a motor vehicle body having an occupant seat located laterally adjacent a door hingedly mounted for movement between open and closed positions and a child seat adapted for mounting on the occupant seat for seating a child, comprising:
a continuous-loop belt having first and second outboard ends mounted on the door for movement with the door between the open and closed positions; a disconnect buckle adapted to attach the first belt end on the door and including a first buckle component mounted on the door and a second buckle component mounted on the first belt end; a control belt retractably mounted inboard of the occupant seating position; a junction ring attached to the control belt and slidably encircling the continuous-loop belt to divide the continuous-loop belt into a lap belt portion and a shoulder belt portion, said junction ring moving from a position generally inboard the seat when the door is closed to a position generally outboard and forward the seat when the door is opened so that door movement automatically moves the lap and shoulder belt portions between an occupant restraining position when the door is closed and an occupant access position when the door is open; and a third buckle component mounted on the vehicle body generally adjacent the door-mounted first buckle component for selective coupling with the belt-mounted second buckle component to adapt the restraint system for restraint of the child seat whereby when the door is opened only the second end of the continuous-loop belt moves outboard and forward with the door so that the lap belt and control belt remain disposed in restraining position over the child seat.

* * * * *